(No Model.) 2 Sheets—Sheet 1.

G. R. VAN SCHOICK.
VEHICLE WHEEL.

No. 549,408. Patented Nov. 5, 1895.

WITNESSES
F. Clough.
M. A. Reevr.

INVENTOR
George R. Vanschick
by Parker & Burton
By
Attorneys.

(No Model.) 2 Sheets—Sheet 2.

G. R. VAN SCHOICK.
VEHICLE WHEEL.

No. 549,408. Patented Nov. 5, 1895.

UNITED STATES PATENT OFFICE.

GEORGE ROBERT VAN SCHOICK, OF ALBION, ASSIGNOR OF TWO-THIRDS TO THOMAS B. WIDOE AND JOSHUA A. KNUDSEN, OF WHITEHALL, MICHIGAN.

VEHICLE-WHEEL.

SPECIFICATION forming part of Letters Patent No. 549,408, dated November 5, 1895.

Application filed January 19, 1894. Serial No. 497,406. (No model.)

*To all whom it may concern:*

Be it known that I, GEORGE ROBERT VAN SCHOICK, a citizen of the United States, residing at Albion, county of Calhoun, State of Michigan, have invented a certain new and useful Improvement in Vehicle-Wheels; and I declare the following to be a full, clear, and exact description of the invention, such as will enable others skilled in the art to which it pertains to make and use the same, reference being had to the accompanying drawings, which form a part of this specification.

This invention relates to vehicle-wheels, and has for its object improvements in that class of vehicle-wheels adapted for use in velocipedes, velocipede-sulkies, and similar vehicles.

The special object of the improvement is a wheel in which the hub is adapted to receive the tenon end of a wooden spoke and the felly is adapted to receive the outer end of such spoke.

Another feature of improvement consists in the means of securing the rubber covering of the ordinary inflated or pneumatic tire to the felly in such a way that it will neither escape therefrom nor creep around the felly, as is frequently the case where the rubber covering is secured to the felly by cement. The manner of securing the covering to the felly employed by me enables me also to remove the rubber tire at any time from the felly without the use of an alcohol-lamp or any other agent for removing the cement commonly used to secure the tire to the felly.

Figure 1:
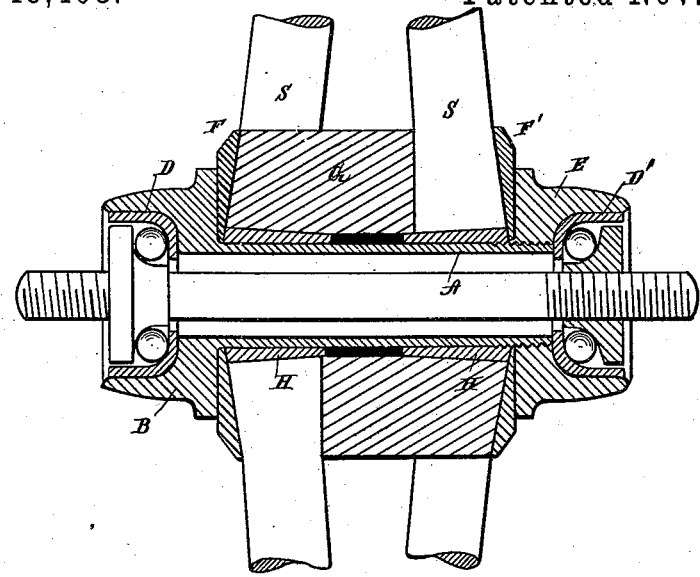
Figure 2:
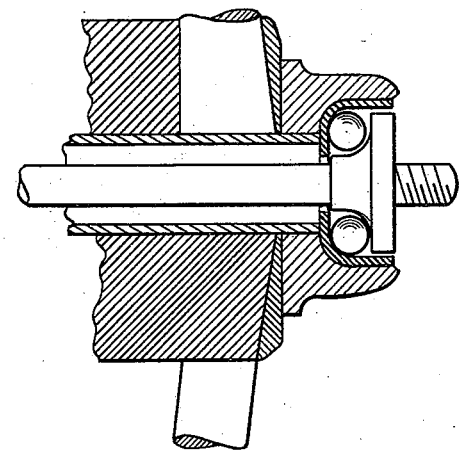
Figure 3:
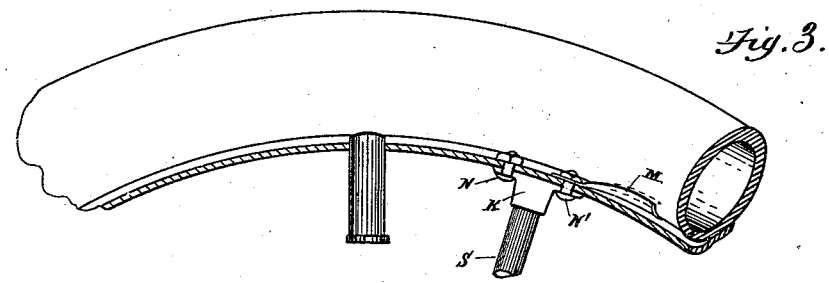
Figure 5:
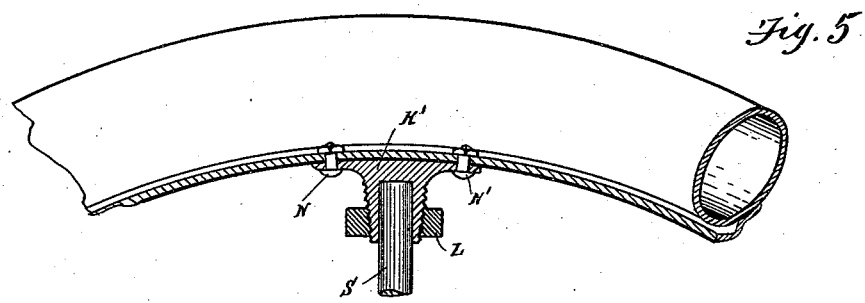
Figure 4:
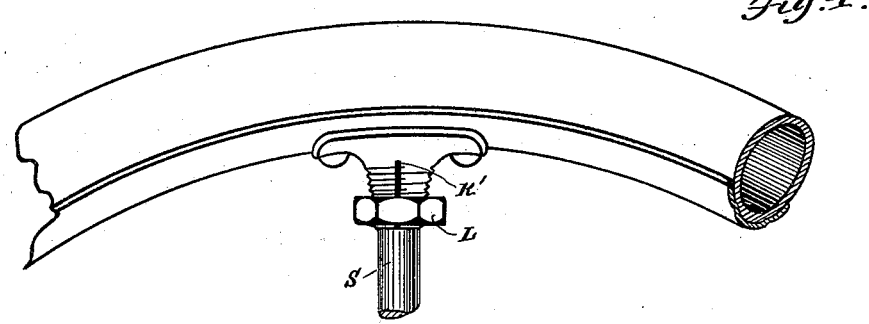

In the drawings, Figure 1 is a section through the hub, showing the manner of securing the spokes to the hub. Fig. 2 shows a section of a similar hub, with one of the holding-wedges of the first figure omitted, thus modifying the construction somewhat. Fig. 3 shows a portion of the felly, pneumatic tire-cover, and the means of attaching the tire-cover to the felly. Fig. 4 is an elevation of the socket used at the felly end of the spokes. Fig. 5 is a section of the same socket.

A indicates a central tube used as a core or inner shell foundation for the hub. Upon one end of the tube A is a flange B, provided with a bell-mouth opening, in which is inserted and crowded a ball-bearing box D. The opposite end of the tube A is screw-threaded and receives an interiorly-threaded nut or burr E, conforming in shape to the flange B and provided, also, like the flange B, with a mouth-opening, in which is inserted and crowded a ball-bearing box D'.

F and F' indicate two washers, one of which is located between the flange B and the socket-piece G of the hub, and the other end of which is located between the flange E and the socket-piece G of the hub.

G indicates a socket-piece made, preferably, of light and comparatively soft material. I prefer to make it of aluminum metal. This socket-piece G is a ring or tube provided at its ends with sockets, and the walls of which sockets, coacting with the washer F or F', form the mortises within which are received the tenons at the inner ends of the spokes. The washers F and F' are dished on those faces which lie toward the socket-piece G, thus producing in the mortise a dovetailed socket in which the distance along the axis of the hub at the inner end is greater than the corresponding distance at the outer side of the hub.

The spokes S S are provided with tenons which have a corresponding shape.

H and H' indicate two conical rings surrounding the shell or tube A and lying immediately at the ends of the spokes S S. The sockets or mortises within which the ends of the spokes are received are in two rows around the hub, thus giving to the wheel the usual stagger.

I prefer to make the washers F and F' of soft and light metal, like aluminum, as this metal is peculiarly adapted to yield slightly under pressure and accommodate itself to inequalities in the parts against which it is compressed. I also find that it is sufficiently constant in size under varying temperatures to constantly hold tightly against the parts in connection with which it is used.

I use for a felly a band of steel similar to that in common use on velocipede-wheels and vehicle-wheels of the class to which this invention belongs. In place of the steel felly I may, however, use a wooden felly, crescentshaped in cross-section, which form is also sometimes used in place of the steel felly.

To secure the end of the spoke to the felly, I first secure to the felly itself a socket-piece K, which is secured to the felly with rivets or short bolts N N'. This socket-piece K may be a simple socket or it may be, preferably, a split socket. (Shown at K' in Figs. 4 and 5.) In this latter form it is threaded on its outside in the form of a conical screw, and a burr L, running on the conical screw, forces the sides of the socket together into gripping-contact with the end of the spoke. When the simple form of socket K is used in assembling the parts of the wheel, the ends of the spokes are inserted in the socket and secured therein by a wedge driven through a hole in the felly and into the end of the spoke.

To prevent the tire or tire-cover from slipping or creeping around the felly I secure to the tire-cover at one or more places, preferably at about three places, a short strip of metal M. This is secured to the cover by stitching the metal onto the cover with thread. In the metal strip M is a hole that engages with the little screw N', that holds the socket K to the felly, and the parts are all secured in place by the burr on the end of the screw or bolt N'.

What I claim is—

1. In a vehicle hub, the combination of a tubular core, a socket ring, dished washers, compression flanges at the ends of the core and means for crowding the spoke radially outward, substantially as and for the purpose specified.

2. In a vehicle hub, the combination of a tubular core having a flange provided with a ball bearing cup at one end and a screw thread at the opposite end, a screw threaded flange provided with a similar ball bearing cup adapted to run on said core, a central socket ring, and a pair of dished washers co-acting with said socket ring and forming therewith rows of dovetailed mortises, substantially as and for the purpose set forth.

3. In a vehicle wheel hub, the combination of a tubular core, a socket ring, a dished washer, forming with the socket ring a row of dovetailed mortises, and means for crowding the spoke radially outward, substantially as described.

In testimony whereof I sign this specification in the presence of two witnesses.

GEORGE ROBERT VAN SCHOICK.

Witnesses:
FRANCIS CLOUGH,
C. F. BURTON.